United States Patent
Liu et al.

(10) Patent No.: US 11,388,096 B2
(45) Date of Patent: Jul. 12, 2022

(54) PERFORMANCE DRIVEN SOFTWARE DEFINED NETWORKING

(71) Applicant: T-Mobile USA, Inc., Bellevue, WA (US)

(72) Inventors: Chunming Liu, Bellevue, WA (US); Fei Yu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 125 days.

(21) Appl. No.: 15/971,975

(22) Filed: May 4, 2018

(65) Prior Publication Data
US 2019/0342219 A1 Nov. 7, 2019

(51) Int. Cl.
*H04L 47/24* (2022.01)
*H04L 12/46* (2006.01)
*H04L 43/0882* (2022.01)

(52) U.S. Cl.
CPC .......... *H04L 47/24* (2013.01); *H04L 12/4641* (2013.01); *H04L 43/0882* (2013.01)

(58) Field of Classification Search
CPC ..... H04L 67/12; H04L 1/0002; H04L 5/0064; H04L 47/24; H04L 12/4641;
(Continued)

(56) References Cited

U.S. PATENT DOCUMENTS 7,606,160 B2 * 10/2009 Klinker ................... H04L 29/06
370/238
7,688,853 B2 * 3/2010 Santiago ................ H04L 47/10
370/230.1
(Continued)

FOREIGN PATENT DOCUMENTS

KR 20020058404 A 7/2002
WO 2017078259 A1 5/2017

OTHER PUBLICATIONS

Software-defined networking. [online]. Wikipedia, 2018 [retrieved on May 4, 2018]. Retrieved from the Internet: <URL: https://en.wikipedia.org/wiki/Software-defined_networking>.
(Continued)

*Primary Examiner* — Philip C Lee
*Assistant Examiner* — Rachel J Hackenberg
(74) *Attorney, Agent, or Firm* — Han Santos, PLLC

(57) ABSTRACT

In a network, communications between nodes in the network can be routed along different communication pathways. The network can include subnetworks provided and administered by third parties, and can include virtual private networks (VPNs), so that the different pathways can be or include VPN tunnels that pass through different subnetworks of the communications network. A central controller can monitor performance of the pathways, including those not in primary use, and dynamically adjust routing of communications traffic between the nodes by directing communication traffic to specific pathways or tunnels. The controller can direct different types of traffic (for example, data, voice) to particular pathways, and can direct traffic to different pathways based on direction of traffic flow (for example, uplink along one pathway and downlink along another pathway). Application Programming Interfaces (APIs) can be provided to enable the controller to request changes to pathways by sending configuring information for routers in those pathways.

17 Claims, 7 Drawing Sheets

(58) Field of Classification Search
CPC ............... H04L 43/087; H04L 41/5022; H04L 47/2433; H04L 47/6215; H04L 47/6265; H04L 47/6275; H04L 47/805; H04L 65/80; H04L 47/20; H04L 43/0882
See application file for complete search history.

(56) References Cited

U.S. PATENT DOCUMENTS

| | | | | |
|---|---|---|---|---|
| 7,801,030 | B1* | 9/2010 | Aggarwal | H04L 45/124 370/228 |
| 8,289,845 | B1* | 10/2012 | Baldonado | H04L 43/16 370/230 |
| 9,806,972 | B2* | 10/2017 | Edwards | H04L 12/66 |
| 9,917,865 | B2* | 3/2018 | Arora | H04L 67/141 |
| 9,973,952 | B1* | 5/2018 | Hosseinmostafa | H04W 24/08 |
| 10,700,982 | B2* | 6/2020 | Bajaj | H04L 43/08 |
| 2005/0185587 | A1* | 8/2005 | Klinker | H04L 45/04 370/237 |
| 2007/0230346 | A1* | 10/2007 | Yamada | H04L 41/5009 370/235 |
| 2012/0155298 | A1* | 6/2012 | Yang | H04W 24/08 370/252 |
| 2013/0346578 | A1* | 12/2013 | Varki | H04L 47/28 709/223 |
| 2015/0289176 | A1* | 10/2015 | Liu | H04W 24/02 370/331 |
| 2017/0134261 | A1 | 5/2017 | Seo et al. | |
| 2017/0155590 | A1* | 6/2017 | Dillon | H04L 43/0888 |
| 2017/0164258 | A1* | 6/2017 | Luo | H04W 28/16 |
| 2017/0366398 | A1* | 12/2017 | Mizrachi | H04L 41/0816 |
| 2017/0366467 | A1* | 12/2017 | Martin | H04L 47/2433 |
| 2018/0041436 | A1* | 2/2018 | Zhang | H04L 12/4641 |
| 2019/0245787 | A1* | 8/2019 | Skalecki | H04L 43/0882 |
| 2019/0335405 | A1* | 10/2019 | Wang | H04W 68/005 |
| 2021/0014157 | A1* | 1/2021 | Zhou | H04L 43/18 |

OTHER PUBLICATIONS

Understanding Two-Way Active Measurement Protocol on Routers [online]. Juniper Networks, 2018 [retrieved on May 4, 2018]. Retrieved from the Internet: <URL: https://www.juniper.net/documentation/en_US/junos/topics/concept/twamp-overview.html>.

Enhanced Interior Gateway Routing Protocol [online]. Wikipedia, 2018 [retrieved on May 4, 2018]. Retrieved from the Internet: <URL: https://en.wikipedia.org/wiki/Enhanced_Interior_Gateway_Routing_Protocol>.

"3GPP; TSG SA; End-to-end Quality of Service (QoS) concept and architecture (Release 14)", 3GPP TS 23.207 V14.0.0, Mar. 15, 2017 See section 5.1.1.3.

International Application No. PCT/US2019/030288, International Search Report and Written Opinion dated Aug. 7, 2019, 11 pages.

* cited by examiner

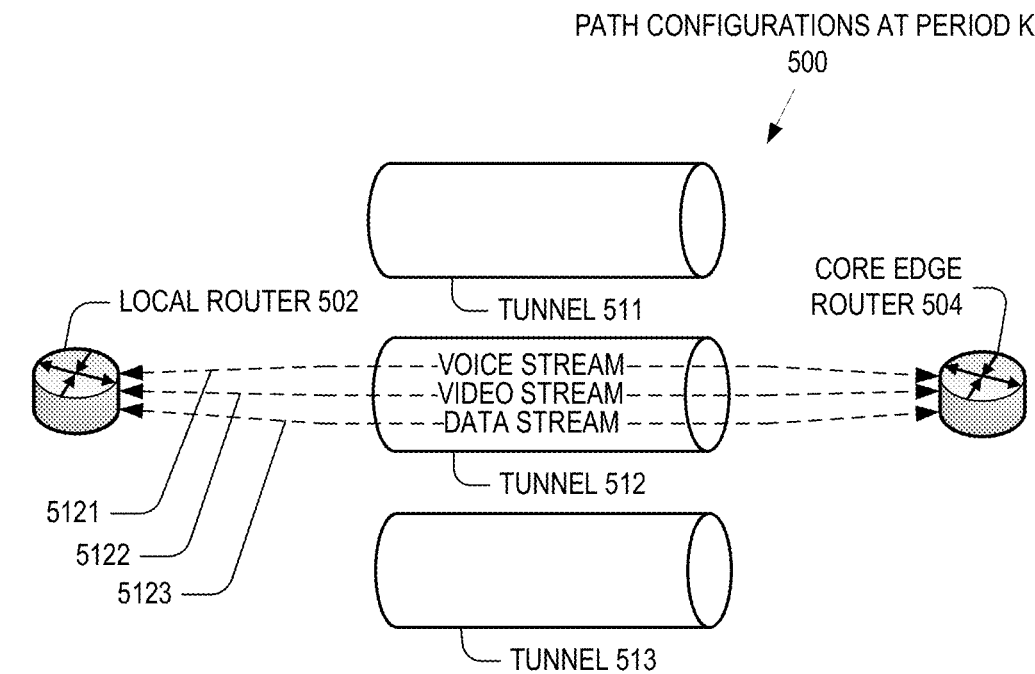
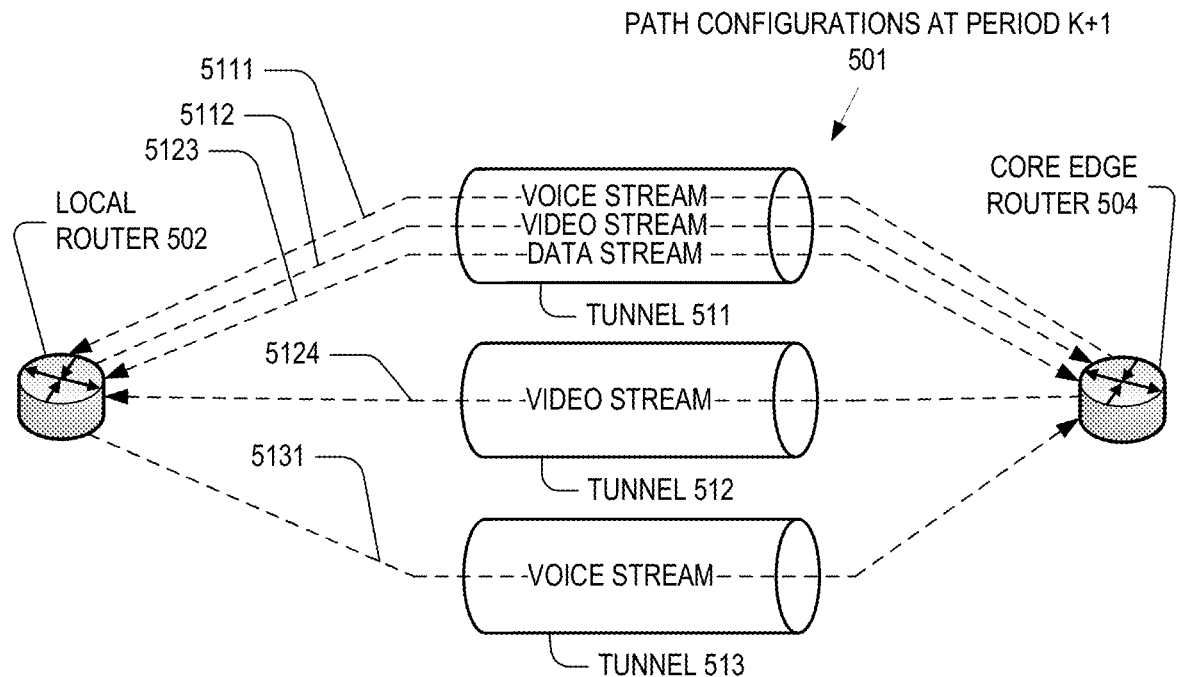
FIG. 5

PERFORMANCE DRIVEN SOFTWARE DEFINED NETWORKING

BACKGROUND

In today's commercial world financial transactions and data related to them such as inventory, amounts of particular goods sold at particular retail locations and so forth are useful to centrally collect and act upon. In particular, where the commercial products include services, such as a telecommunications provider selling mobile phones and also voice call and data services (featuring 4G LTE or 4G Long Term Evolution connectivity for example), there is additional need to collect customer information centrally to efficiently activate and then track, administer and update a service package that a customer has purchased.

Wireless telecommunications providers having retail stores or locations where customers can select a device such as a mobile phone and contract for or subscribe to a service package to use the device can rely on data links to communicate subscriber information from the retail store to a central location or operations center of the wireless telecommunications provider from which telecommunications services are managed and administered.

In a present example, communication of subscriber information from a retail store or location to a central location or operations center is done using three communication links for redundancy. A network of in-store sales devices including computers, multifunction devices, specialized "cash registers" and so forth, is connected to a local or "retail" router that has two links or pathways including Virtual Private Network (VPN) tunnels that connect through an Internet Service Provider's Internet network to routers such as edge routers in a private, core network of the wireless telecommunications provider, to convey subscriber information and enable the wireless telecommunications provider to provide and manage services to its customers. A third link from the local router to the core network's edge router(s) includes a wireless segment from the local router to a cell tower, and then a communication tunnel through a carrier's Ethernet network between the cell tower's cell site router and the core network's edge router. Thus, the wireless telecommunications provider uses third-party services and infrastructure (a carrier's Ethernet network, and an ISP's network connected to and supporting data flow through the Internet) to convey business information between the retail location and its operations center.

One of the three links is designated as a primary tunnel or line of communication, and the others are held in reserve for selection as an alternate primary tunnel in the event problems arise with the current primary tunnel. Performance of the current primary tunnel is actively monitored, but performance of the reserve links is not. The third link through the carrier's Ethernet network is subject to a carrier-grade Service Level Agreement (SLA) between the Ethernet carrier and the wireless telecommunications provider, that specifies performance expectations. In contrast, the other two links through the ISP's network often have no guarantees of particular performance levels.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

FIG. 5 illustrates an example change from a first configuration of communication pathways between a local node and a central node, to a second configuration.

DETAILED DESCRIPTION

Figure 1:
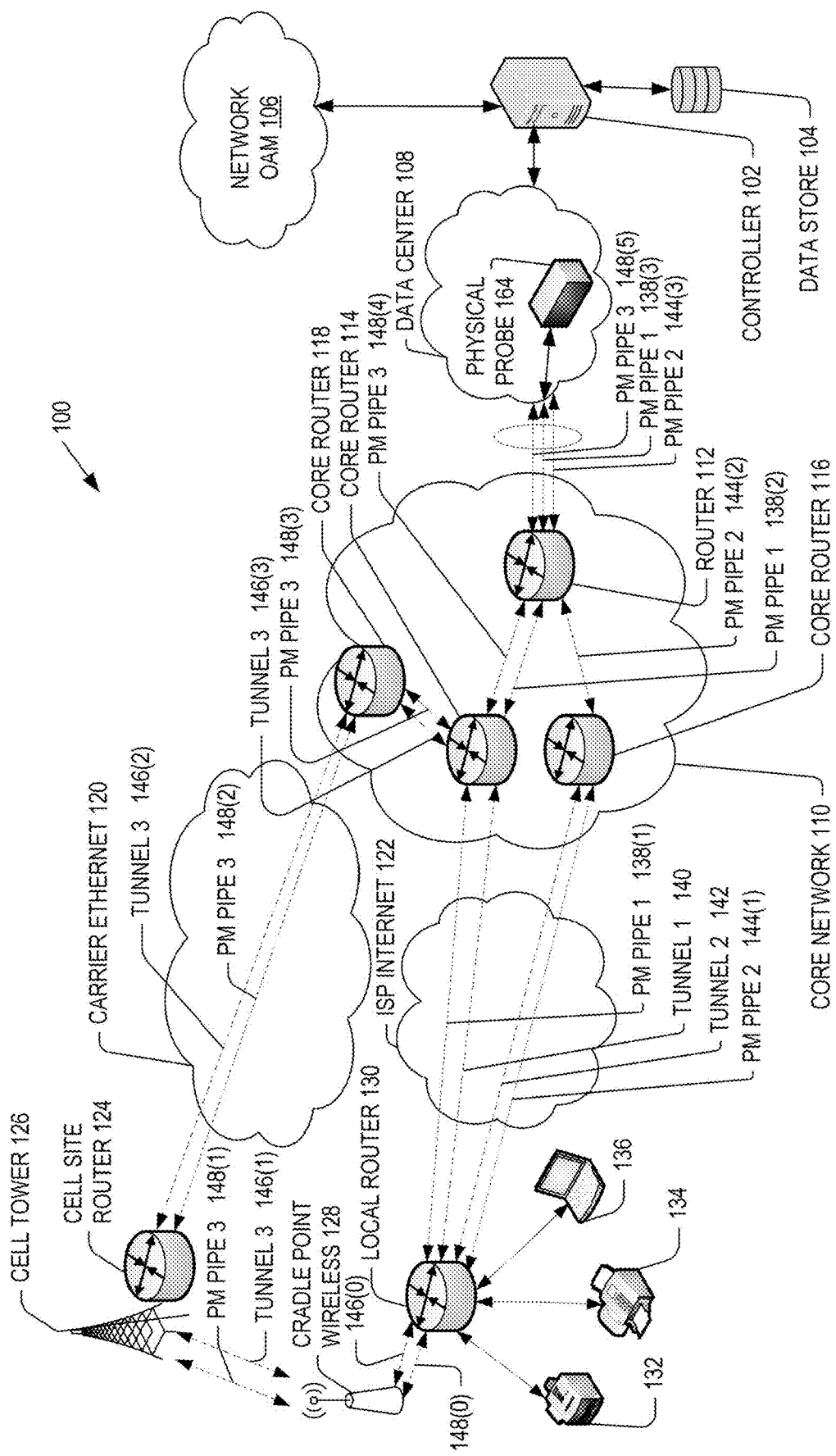
FIG. 1 shows an illustrative computing environment and network architecture for implementing techniques to improve network communications performance between a local node and central or core nodes separated by different subnetworks.

This disclosure is directed to dynamic techniques for improving flow of information between nodes in a communications network of a wireless telecommunications provider or Mobile Network Operator, through different communication pathways that can be adjusted to balance use of communication resources and increase one or more of efficiency, quality and quantity of information flow between the nodes. The communication pathways can lead between 1) one or more nodes in a core, private network of the Mobile Network Operator that implements or supports centralized management and control of the Mobile Network Operator's telecommunication functions and services, or central nodes, and 2) remote or local nodes, for example edge nodes at or near an outer edge of the Mobile Network Operator's communications network. The core network can be a subset of the Mobile Network Operator's communications network.

The core nodes and the local nodes can be connected via secure communication pathways formed by Virtual Private Network (VPN) tunnels through intervening networks or subnetworks that separate the core network from the local nodes. The intervening networks or subnetworks may be operated by third parties (for example, Alternative Access Vendors), and can include for example Internet Service Provider (ISP) networks that form part of the Internet and enable connection to or through the Internet, as well as Ethernet Carrier networks that can link between wireless communication cell towers and the Internet or a private corporate network such as a core network of a Mobile Network Operator.

In a more specific example, the Mobile Network Operator's local nodes are located within retail stores or locations where customers can purchase a device such as a mobile phone and a package of services that the user can access via the mobile phone. Information regarding the customer, the device and the service contract collected at the retail location can be uploaded to the Mobile Network Operator's central location or operations center. The central location or operations center can be located within a core network of the Mobile Network Operator, or can be located elsewhere within the Mobile Network Operator's communications network and accessed through the core network of the Mobile Network Operator. The central location or operations center can communicate with the local node via communication pathways including VPN tunnels between the local node (for example, a local router at or near the retail location) and core nodes or routers at an edge or within the core network. The Mobile Network Operator can then use this information about the customer to provide appropriate services to the customer and generally manage and administer the telecommunications services the Mobile Network Operator provides.

A central controller within or connected to the operations center of the Mobile Network Operator can adjust the pathways and use of the pathways between the local node and the core node(s) to balance use of communication resources and increase one or more of efficiency, quality and quantity of information flow between the nodes. In some embodiments, the controller does this by monitoring performance of multiple communication pathways between the local node and the core node(s), even those not designated as primary or active pathways. Based on the monitored performance, the controller can dynamically adjust routing of communications traffic between the nodes by directing communication traffic to specific pathways or tunnels. In particular, the controller can designate a different pathway as a primary pathway, can direct different types of traffic or Classes of Service (CoS) such as data, voice, or video, to particular pathways, and/or traffic requiring different types or levels of Quality of Service (QoS), and can direct traffic to different pathways based on direction of traffic flow (for example, uplink voice data on one pathway and downlink voice data on another pathway). As noted with additional detail further below, QoS generally refers to overall performance of network-based services or functions and can be based on measured performance factors as well as refer to desired or specified performance levels. Application Programming Interfaces (APIs) can also be provided to enable the controller to request changes to pathways by sending configuring information for routers in those pathways. This can be particularly useful when those routers belong to a third-party network or subnetwork, such as an ISP, to either control those routers under delegated authority from the ISP or to alert the ISP of problems with router and pathways in or through the ISP's network.

Example Architecture

FIG. 1 shows an illustrative computing environment and network architecture 100 for implementing techniques to improve network communications performance between a local node and central nodes of a mobile network operator's telecommunications network, where the local node and central nodes are separated by different subnetworks that may be provided by third party entities.

In particular, FIG. 1 shows a Software Defined Network controller device 102 that monitors communication pathway Tunnels 1, 2 and 3 extending between a local router 130, and routers 114, 116, and 118 in a core network 110 of a mobile operator. The routers 114, 116, 118 can, for example, be head end routers or edge routers, functioning at an edge or boundary of a network (for example, the mobile operator's core network 110). The Tunnels 1, 2 and 3 can be VPN (Virtual Private Network) tunnels that provide secure communications through different networks. The controller 102 can be connected to a core network 110 of the mobile network operator as shown, can be within the core network 110, or can be in any physical location that affords sufficient connectivity to monitor and control the local and core routers and communication pathways between them. The local router 130 can be located within or near a retail location or store of the mobile network operator. Local devices connected to the local router 130, such as a multi-function device 132, a fax machine 134, and a computer or specialized cash register 136, are located at the retail store or location of the mobile network operator. Alternatively, the retail store or location can be owned or operated by a third party.

Generally, various devices shown in the Figures can be divided into three classes by location. First, a provider (P) device, meaning that the device is located in a core or backbone of a provider's network, for example, the mobile network operator's communications network. Second, a customer edge (CE) device, meaning a device such as a router that is located on a customer's premises and provides an interface between a local area network of the customer and the provider's core network. Third, a provider edge (PE) device, meaning a device such as a router that is located at or near an edge of the provider's network and connects CE routers with P routers. PE routers can also connect between P routers in the provider's network. In an example where the store or retail location in which the local router 130 is located belongs to the mobile network operator, then the local router 130 can be considered to be a PE device at a far edge of the mobile operator's communications network, with different parts of the communications network possibly connected via third party infrastructure (for example, the Internet Service Provider (ISP) Internet 122). In an example where the store belongs to a third party that, for example, sells mobile devices for use with the mobile network operator's communications network, the local router 130 can function as, or be considered to be, a CE device. Routers 114, 116, 118 can be considered as PE devices, and router 112 can be considered as a P device.

Returning to a more specific discussion of FIG. 1, the Tunnels 1, 2 connect the local router 130 with the core routers 114, 116 via single pathway segments 140, 142 through an ISP Internet 122 located between the local router 130 and the core network 110. Tunnel 3 first has a link 146(0) between the local router 130 and a cradle-point wireless transmitter 128, then a wireless link or segment 146(1) from the cradle-point wireless transmitter 128 between the local router 130 and a cell tower 126, and then a next pathway segment 146(2) from a cell site router 124 of the cell tower 126, through a carrier Ethernet network 120 to a router 118 in the core network 110. Communications or links between the local router 130 and the cradle-point wireless transmitter 128 can be variously wired, fiber optic, or wireless.

Also shown in FIG. 1 are performance monitoring (PM) pipes 1, 2 and 3 that correspond to the Tunnels 1, 2 and 3 and monitor performance of these tunnels. In some embodiments, the pipes function within the tunnels, and can be implemented using Two-Way Active Measurement Protocol (TWAMP) technology (see also Internet Engineering Task Force RFC 5357) or other suitable monitoring technologies that support monitoring of performance in both directions through the tunnels, as well as performance of the tunnels with respect to a) different types of data or Classes of Service (CoS) such as Data, Voice, Video, Signaling, Operation and Administration (OAM) or other appropriate types or classes, and/or b) different Quality of Service (QoS). QoS generally refers to overall performance of a service or network functions in a computer or telecommunications network, and can be based on measured performance factors such as packet loss, bit rate, throughput, jitter, availability, transmission delay, and the like. QoS can also refer to desired or specified performance levels or thresholds and can be affected by or implemented using various resource control or allocation mechanisms such as traffic prioritization mechanisms and settings. QoS can thus be used for example to systematically provide different priority access to resources for different users, applications, and/or data flows, and/or guarantee threshold levels of performance for specific users, applications, and/or data flows.

By way of example, in some embodiments different CoS streams can be closely monitored, can have data in the CoS streams additionally tagged or labeled to facilitate monitoring, and/or can have additional, independent test data introduced into or alongside the streams (for example, a separate test/monitoring stream having a same or similar CoS to a stream being managed by the monitoring but bearing test data or data to specifically facilitate monitoring). In some embodiments, different QoS for different streams (CoS or other streams, for example data flows along different logical or physical pathways) is alternatively or additionally monitored.

Note also that in various embodiments different Software Defined Networking (SDN) technologies or protocols can be used separately or in various combinations to dynamically configure topology and function of the network shown in FIG. 1, including configuration of communication pathways and VPN tunnels. Example technologies include, for example, the OpenFlow protocol or other suitable protocols or technologies, as well as the Enhanced Interior Gateway Routing Protocol (EIGRP) (see also Internet Engineering Task Force RFC 7868).

As further shown in FIG. 1, the PM pipes pass through or along the tunnels and are connected to (or results of their monitoring are forwarded to) a physical probe 164 located in a data center 108 which is part of the mobile network operator's communications network. The data center 108 passes the monitoring information on to the controller 102, and the controller 102 can then make decisions to reconfigure the tunnels based on the monitoring information. As will be discussed further with respect to later Figures, maintenance entity software modules that can form functional endpoints or midpoints for the PM pipes and support the monitoring functions of the PM pipes, can be variously located in routers, servers, controllers and other entities within the infrastructure of FIG. 1 and within the mobile network operator's communications network as needed or desired. As shown in FIG. 1, the PM Pipe 3 has six segments—148(0) between the local router 130 and the cradle-point wireless transmitter 128, 148(1) in the wireless link between the cradle-point wireless transmitter 128 and the cell tower 126, 148(2) between the cell site router 124 and the router 118, 148(3) from the router 118 to the router 114, 148(4) to the router 112, and 148(5) from the router 112 to the physical probe 164. The PM pipes 1, 2 each have three segments—segments 138(1) and 144(1) respectively from the local router 130 to the routers 114 and 116, segments 138(2) and 144(2) between the routers 114, 116 and the router 112, and then segments 138(3) and 144(3) between the router 112 and the physical probe 164.

FIG. 1 shows, in accordance with some embodiments, that the mobile network operator's communications network can include the core network 110 in communication with the data center 108 as well as a network Operation and Administration Management (OAM) center 106, both in connection with the controller 102 and a data store 104 that can support the controller 104 and/or other elements of the communications network. As noted earlier, functions of the controller 102 as well as functions of other elements in the communications network such as a core network, a data center, and a network OAM center can be variously organized, located, or consolidated within the mobile network operator's communications network while preserving ability to dynamically manage the tunnels connecting to the local router 130, as variously described herein.

Figure 2:
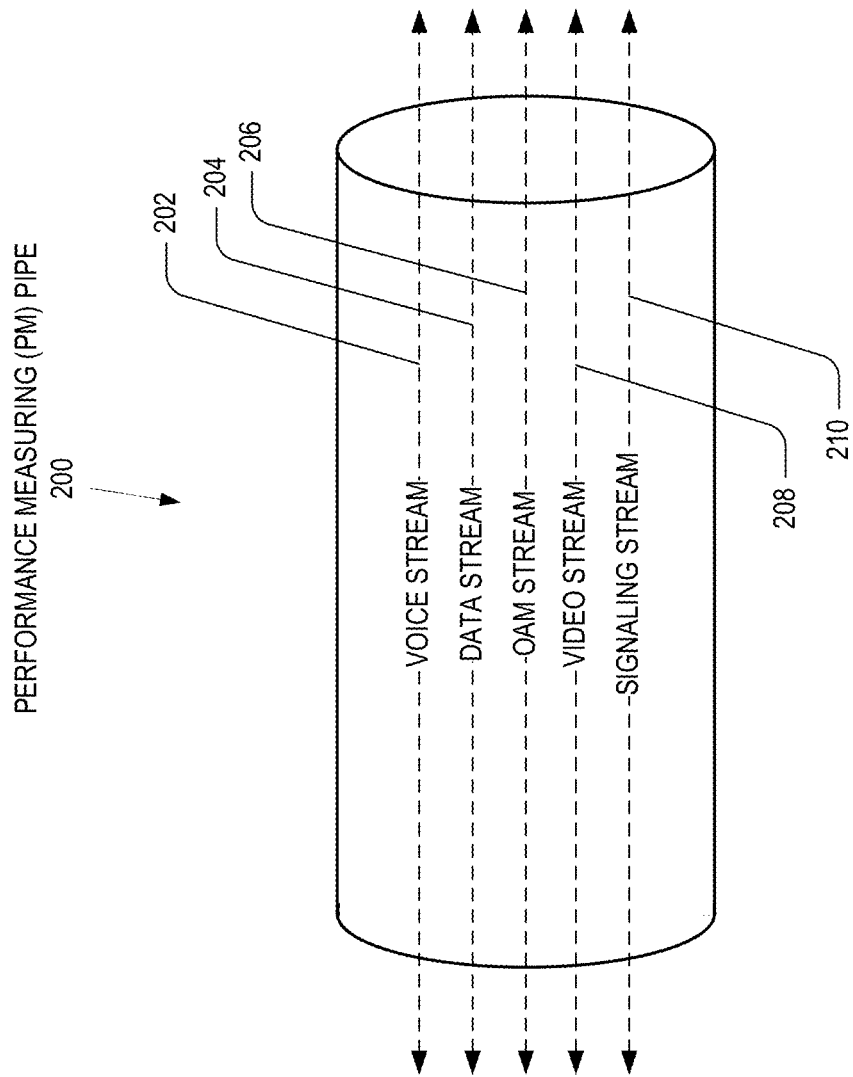
FIG. 2 shows an illustrative performance measuring pipe for monitoring performance of communication pathways or tunnels between the local node and the central nodes.

FIG. 2 illustrates details of a PM pipe 200 that can form the basis of the pipes 1, 2 and 3 shown in FIG. 1. The pipe 200 includes distinct measurement streams that independently measure tunnel performance with respect to different types of data or Classes of Service (CoSs) and/or QoSs—for example a voice stream 202, a data stream 204, an OAM stream 206, a video stream 208, and a signaling stream 210. In some embodiments, performance of each stream is measured independently with respect to direction of data flow through the pipe, so that a set of performance measurements for flow of a stream in one direction through the pipe can be different from a set of performance measurements for flow in the opposite direction. Key performance indicators (KPIs) generated from measurements of the pipe can include, for example, delay, jitter, and frame loss ratio (FLR). In some embodiments, each CoS has its own quality of service (QoS) marking, port number, and KPI thresholds. For example, a signaling CoS could have a source port of 24, a QoS of 24, a delay threshold of 200 milliseconds, a jitter threshold of 100 milliseconds, and an FLR of 0.2%; and a voice CoS could have a source port of 40, a QoS of 40, a delay threshold of 100 milliseconds, a jitter threshold of 20 milliseconds and an FLR of 0.3%.

Figure 3:
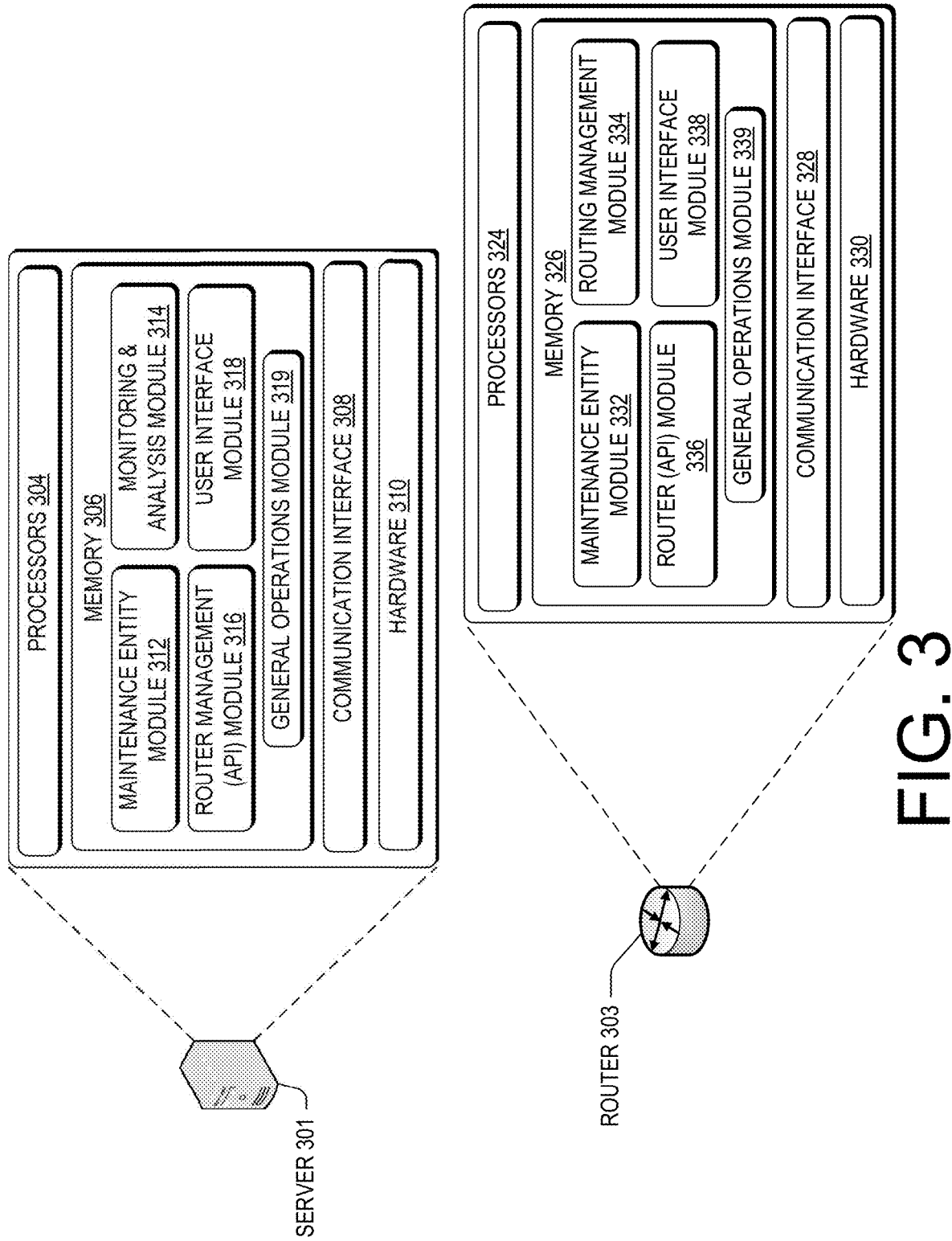
FIG. 3 shows illustrative details for various routers and servers/controllers in the architecture of FIG. 1.

FIG. 3 shows illustrative details of a server 301 and a router 303 that can form the basis for, or be implemented as, the various routers, and servers or controllers, shown in FIG. 1 and variously described herein—for example the routers 130, 124, 118, 114, 110, 112 and the controller device 102.

The server 301 includes processors 304, hardware 310, and a communication interface 308. The server 301 also has a memory 306 that includes (but is not limited to) the various software modules shown. A router management API (Application Programming Interface) module 316 can facilitate communications such as command and status data between the server 301 and routers in the communications network, for example at tunnel endpoints. In some embodiments the router management API module 316 can facilitate communications between the server 301 and routers in a third-party network, such as the ISP network 122 through which communications tunnels pass. In situations where the third party (for example, the ISP) enables the mobile network operator to access status information of routers in the third-party network and in situations where the third party grants or delegates a degree of control over the third-party network routers to the mobile network operator, additional efficiencies may be possible. For example, the mobile network operator can use performance data regarding tunnels through the third-party network to become aware of problems in that network, to alert the third party to those problems and provide diagnostic information, and perhaps to recommend or even command changes to server configurations in the third-party network to overcome the problems and improve performance of the third-party network with respect to the mobile network operator's tunnels.

The server's memory 306 can also include a monitoring and analysis module 314 to support analysis of performance data from the PM pipes and collected by a maintenance entity module 312 and corresponding decision-making and automatic reconfiguration of the tunnels and data flow through them. The maintenance entity module 312 supports implementation of the TWAMP monitoring protocol and/or other similarly-appropriate monitoring protocols. The memory 306 additionally includes a general operations module 319 that can support various functions or tasks as required or desired to serve needs of the mobile network operator's communications network. Functions of the modules 312, 314, 316 can be variously combined into a single module or otherwise distributed among different modules. In some embodiments, the memory 306 also includes a user interface module 318 to facilitate direct interaction with a human operator, for example for auditing or control purposes.

The router 303 includes processors 324, a communication interface 328, hardware 330, and a memory 326 that contains various software modules including a maintenance entity module 332 that, like the module 312, supports implementation of the TWAMP monitoring protocol and/or other similarly-appropriate monitoring protocols. Also within the memory 326 is a routing management module 334 that supports various routing functions of the router. A router API module 336 can support communications between the router and other entities, for example the server 301, and the controller 102. Also included are a user interface module 338 to facilitate direct communications with a human operator if needed, and a general operations module 339 that can enable the router 303 to accept and accomplish various tasks within the mobile network operator's communications network.

The memories 306, 326 may include computer-readable storage media. Computer-readable storage media may include volatile and non-volatile, removable and non-removable media implemented in any method or technology for storage of information such as computer-readable instructions, data structures, program modules, or other data. Computer-readable storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media does not consist of, and is not formed exclusively by, modulated data signals, such as a carrier wave.

Figure 4:
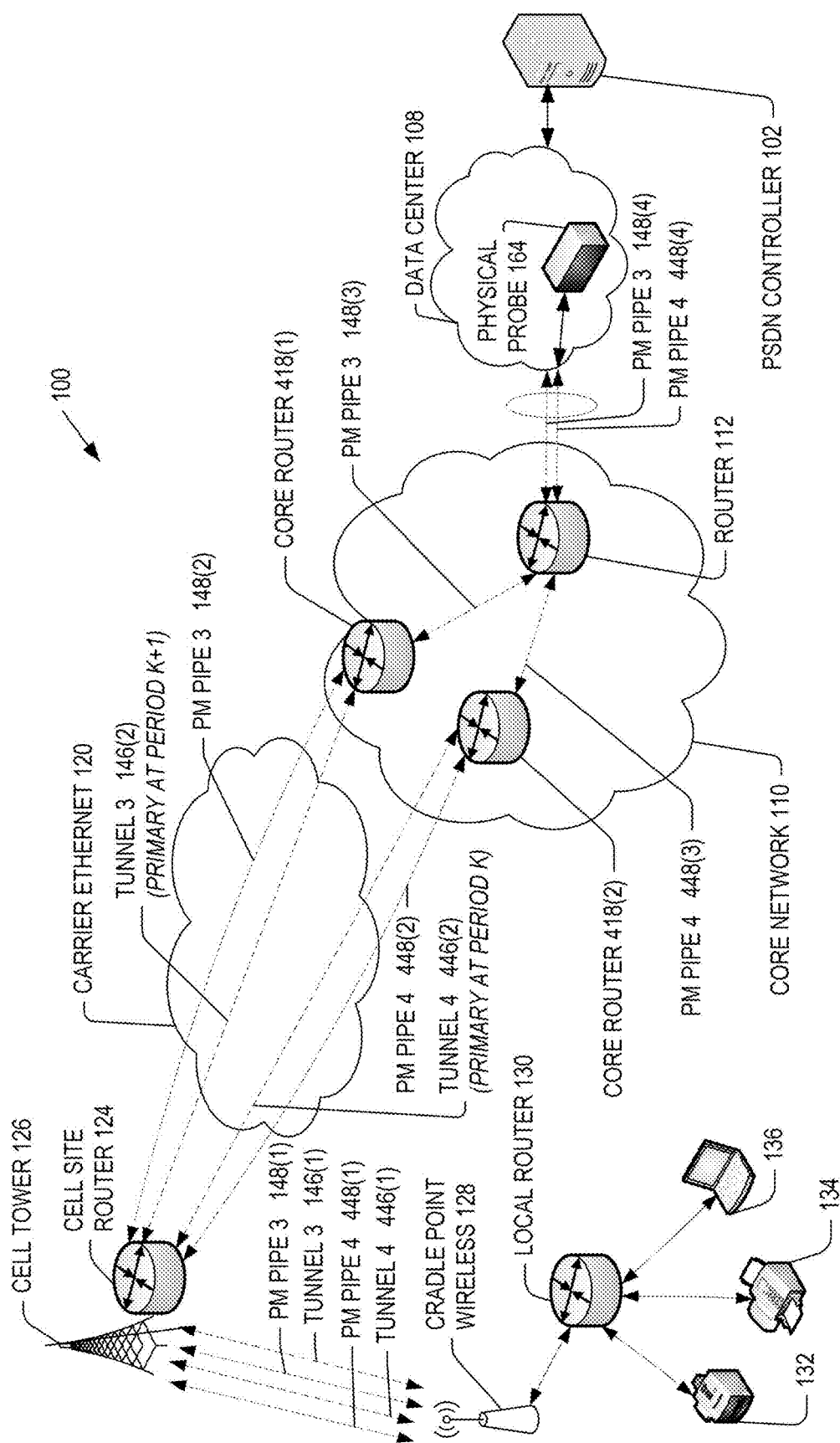
FIG. 4 shows an illustrative alternative implementation of communication pathways involving the Ethernet network shown in FIG. 1.

FIG. 4 illustrates an alternative implementation of communication pathways involving the Ethernet network 120 of the architecture shown in FIG. 1. Instead of a single Tunnel 3 as in FIG. 1, in FIG. 4 there are two tunnels, Tunnel 3 and Tunnel 4 that pass through the Ethernet network 120 between the local router 130 and routers 418(1), 418(2) in the core network 110. The Tunnel 4 has two segments, a first wireless segment 446(1) between the cradle-point wireless transceiver 128 and the cell tower 126, and a second segment 446(2) between the cell site router 124 and a router 418(2). A corresponding PM pipe 4 for the Tunnel 4 is also shown, with a segment 448(1) between the transceiver 128 and cell tower 126, and a segment 448(2) between the cell site router 124 and the router 418(2). An additional segment 448(3) extends the PM pipe 4 from the router 418(2) to the router 112, and a last segment 448(4) extends the PM pipe 4 from the router 112 to the physical probe 164 which can then communicate monitoring data to the controller 102 via the data center 108.

Of note in FIG. 4, and in accordance with some embodiments, at a time period K, Tunnel 3 is used as a primary tunnel to carry most or all data communications with the local router 130. Then at or within a next time period K+1, after comparing key performance indicators provided by the PM pipes 3, 4 for each CoS and/or QoS of data for Tunnel 3 and Tunnel 4, the controller 102 designates Tunnel 4 as the primary tunnel.

In some embodiments, for example those in which EIGRP is implemented, the controller 102 can designate a particular tunnel as the primary tunnel, or can effectively select a group of tunnels as candidates to be the primary tunnel, by setting tunnel delays and EIGRP offsets. For example, setting a tunnel delay threshold at the local router 130 can influence which pathway or tunnel is designated primary by default, and EIGRP offsets can influence routes or pathways that are advertised out as candidate pathways or tunnels available and viable for use.

This process of FIG. 4 can also be applied to the Tunnels 1, 2 of FIG. 1, for example where at a time period K+2 the Tunnel 1 is designated as the primary tunnel, and then at a time period K+3, after comparing key performance indicators provided by the PM pipes 1, 2, 3, and 4 for each CoS and/or QoS of data for Tunnels 1, 2, 3, and 4, the controller 102 designates Tunnel 4 as the primary tunnel.

Example Processes

FIG. 5 illustrates an example of pathway reconfiguration that can be implemented in some embodiments, from a first configuration 500 during a time period K, to a second configuration 501 for or during a time period K+1. During the time period K, communications between a local router 502 and a core edge router 504 all pass through a tunnel 512 which can be a VPN tunnel. The communications include a bidirectional voice stream 5121, a bidirectional video stream 5122, and a bidirectional data stream 5123, each stream having a CoS and/or QoS corresponding to its data type and passing through a tunnel 512 which can be a VPN tunnel. The other two tunnels 511, 513 are available, and monitored, but are not in use for these voice, video and data stream communications during the time period K.

After monitoring communications through the tunnel 512 and checking status of the tunnels 511, 513, a controller adjusts the pathways to form the configuration 501. In particular, the bidirectional voice stream is split so that a downlink portion 5111 of the voice stream passes from the core edge router 504 to the local router 502 through the tunnel 511, and an uplink portion 5131 of the voice stream passes through the tunnel 513 from the local router 502 to the core edge router 504. The bidirectional data stream 5123 is shifted from tunnel 512 to tunnel 511. The bidirectional video stream is split into separate directions and an uplink portion 5112 from the local router 502 to the core edge router 504 is shifted to the tunnel 511, while a downlink portion 5124 from the core edge router 504 to the local router 502 remains in the tunnel 512.

Example operations described herein, for example with respect to FIG. 5, can in some embodiments be facilitated or augmented using Policy-Based Routing, where routing decisions are based on policies set by a network administrator (and in some embodiments, implemented by a controller such as the controller 102). Policies can be based for example on CoS, on Quality of Service (QoS) factors (e.g., KPIs such as packet loss, throughput, transmission delay, jitter, frame loss ratio, bit rate and so forth), and/or on other factors.

In some embodiments, pathway configurations can be adjusted for one or more reasons. For example, when threshold performance levels for a given pathway or tunnel are no longer met. In a case where the tunnel 512 of FIG. 5 is a primary tunnel (as in configuration 500), and then performance drops below a given threshold or one or more key performance indicators (KPIs) drops below an acceptable limit, the tunnel 511 can instead be designated as a primary tunnel. Or, as shown in configuration 501, different streams through tunnel 512 can be re-allocated so that tunnel performances for the various streams are above respective performance minimum thresholds for those streams. Tunnel performance can suffer for multiple reasons, for example when communication traffic through the tunnel increases to a point where traffic through the tunnel slows, or when capability of the tunnel decreases due to a malfunction or another environmental change. In addition, monitoring of the tunnels can demonstrate that some tunnels are faster, or have better performance, for some classes of service (CoS) and/or QoS, and/or are faster or have better performance for streaming in one direction than in another direction, for all CoS and/or QoS or for a given one or several CoS and/or QoS. In that kind of situation, shifting pathways to match CoS and/or QoS streams by type and/or direction to tunnels best suited to them can efficiently increase performance of communications through the tunnels, and thus benefit overall function of the mobile network operator's network. Specific benefits can include lower power consumption, lower equipment demand and therefore less capital outlay for equipment, lower operating costs, greater traffic flow and thus profitability, and increased agility/resilience of the network to solve communications problems quickly and with minimal disruption to business operations. Additional reasons for shifting or adjusting pathway configurations include re-prioritizing one or more CoS and/or QoS streams above others and anticipating changes in load and/or network capability. For example, communications equipment in a given pathway may need to be taken off-line for maintenance, repair or replacement, or a change in communication traffic can be anticipated such as an increase in traffic due to a nationwide sales event at the mobile network operator's retail locations. Pathway configurations can also be changed to explore and test different pathways, to gather performance data and build a map of viable network pathways and tunnels within the network, and to periodically repeat these activities to verify or update performance of communication pathways. In some embodiments this can be done by systematically rotating communications through different pathways or tunnels.

Figure 6:
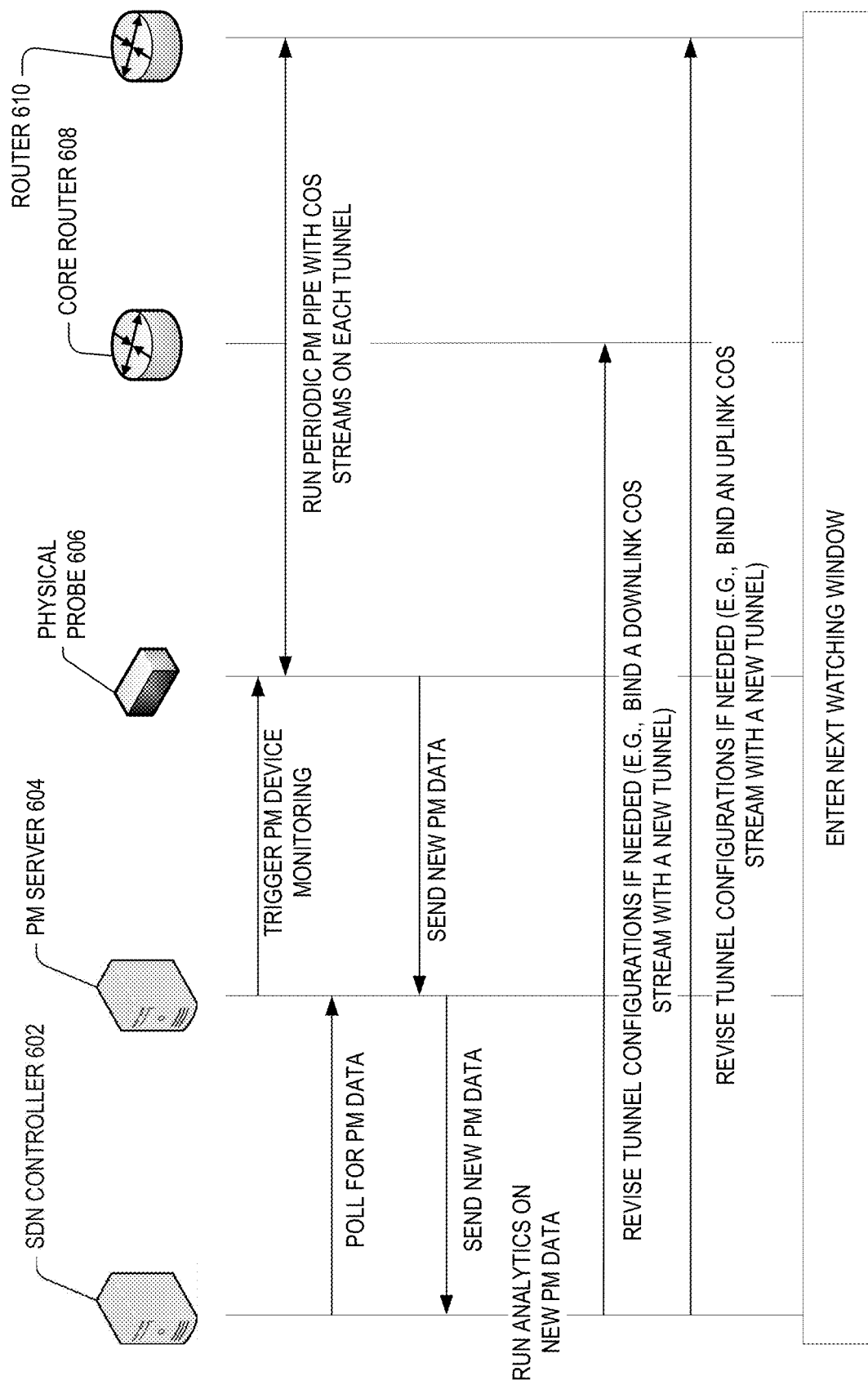
FIG. 6 is a block diagram illustrating example interactions between elements shown in architectures of FIGS. 1 and 4, that support dynamically managing communication links or pathways between the local and central nodes.

FIG. 6 is a block diagram illustrating an example communication flow between components, in accordance with some embodiments. A software defined network (SDN) controller 602 polls a performance monitoring (PM) server 604 for performance monitoring data and receives monitoring data from the server 604. The SDN controller 602 also runs analytics algorithms on the received PM data, and then communicates with a core router 608 and a router 610 to revise tunnel configurations between the routers 608, 610 as needed and based on the analytics results, for example to bind a downlink CoS and/or QoS stream with a new tunnel or to bind an uplink CoS and/or QoS stream with a new tunnel between the routers 608, 610. The PM server 604 can trigger monitoring and receive monitoring results through a physical probe 606, which can run performance monitoring pipes for CoS and/or QoS streams on each tunnel between the routers 608, 610 and receive performance data gathered via the monitoring pipes. The router 610 can be a local router such as the local router 130. Although element 610 is shown as a router, it can be any type of device, switch, or router, that supports performance measurement. As shown, the various operations in FIG. 6 can be performed cyclically, so that after tunnel configurations are adjusted, a new watching or observation period is commenced and a cycle of observing and adjusting is begun anew. Observation periods can span fractions of a second, seconds, minutes, hours or any appropriate time frame, and can be dynamically adjusted as needed or desired, for example by the controller 602 or other responsible entity within the mobile network operator's communications network. In some embodiments, functions of the controller 602 and the server 604 can be combined in a single device, or can be distributed amongst different devices or software modules variously implemented within the mobile network operator network.

Figure 7:
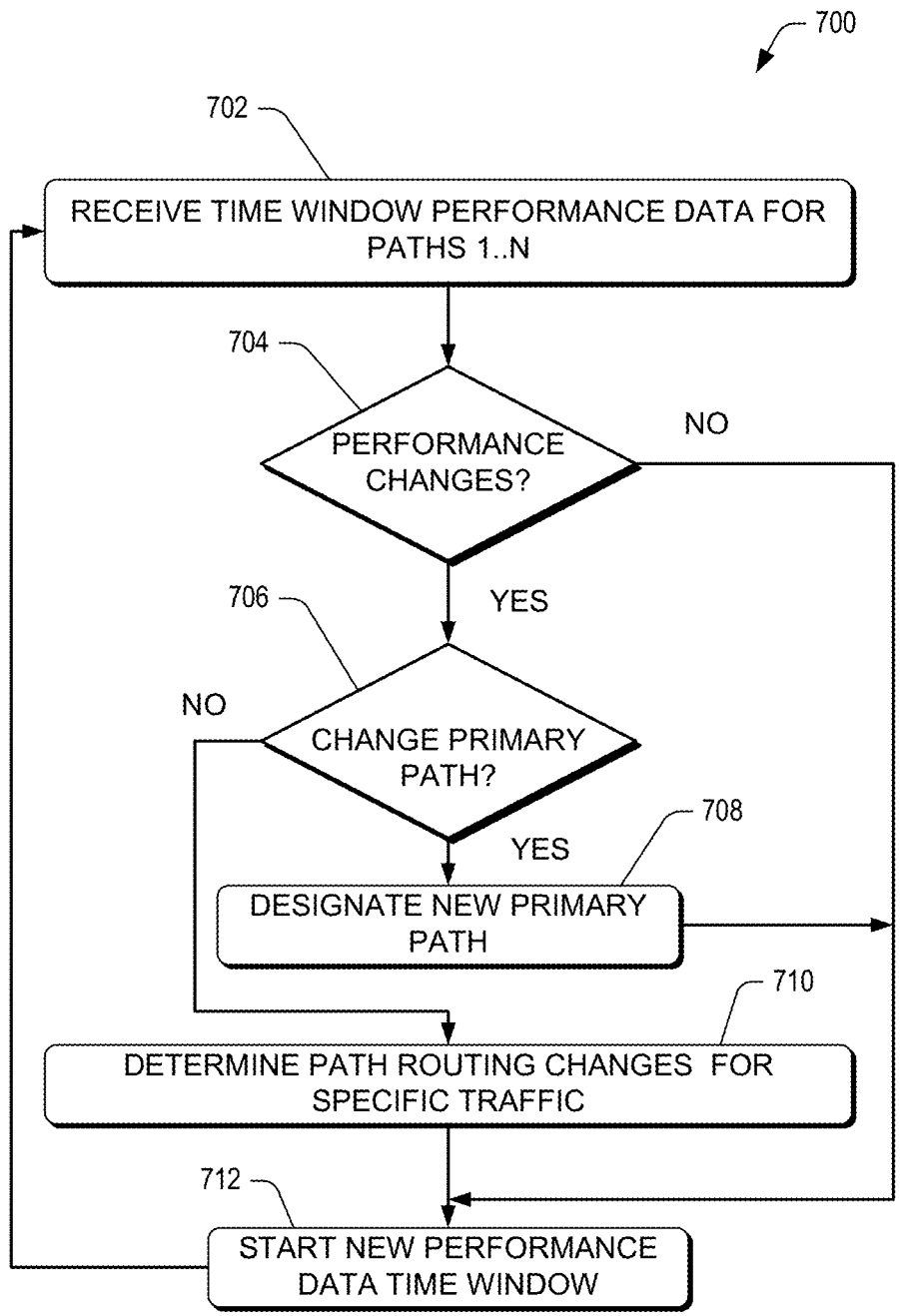
FIG. 7 is a flow diagram of an illustrative process for dynamically managing communication links between nodes in a network such as that shown in of FIG. 1.

FIG. 7 is a flow diagram of an illustrative process for dynamically managing communication links between the nodes in a communications network having an architecture such as that shown in FIG. 1. In some embodiments this process is implemented from the perspective of a controller, such as the controllers 102, 602.

In a first block 702, the controller receives performance data for communication paths or pathways and tunnels such as the VPN Tunnels 1, 2, 3, 4 between a local node such as the router 130 and core nodes such as routers 114, 116, 118, 418(1), 418(2). In a next block 704, a determination is made whether performance of the tunnels has changed in ways or amounts that merit adjustment. For example, this can be implemented in terms of one or more threshold values relating to network performance, involving performance of specific streams of data (Class of Service streams), overall performance of a given pathway or tunnel, relative levels of performance or capacity of different pathways, and so forth. Measured performance can be compared against one or more of the threshold values, with results determining or indicating whether adjustments will or might yield performance improvements. If at block 704 the determination is No, then the process continues to block 712 where a new or next time window for gathering performance data is started, and from block 712 the process returns to block 702 to begin the cycle anew.

If at block 704 the determination is Yes, then the process moves to block 706 where a determination is made whether to change configuration of the tunnels to designate one of the tunnels, or a different one of the tunnels, as a primary tunnel that will take all or most of the communication traffic to and from the local node. For example, shifting from configuration 501 to configuration 500 of FIG. 5, or changing a primary tunnel to be a secondary tunnel, and the formerly secondary tunnel to be a new primary tunnel. This determination can be made with respect to the first set of threshold values or factors as compared against various performance metrics received in block 702.

If the determination at block 706 is Yes, then the process moves to block 708 where the controller designates a new or different one of the tunnels to be the new primary tunnel, and sends information conveying that designation and corresponding tunnel configuration information to the local and affected core nodes so that the new configuration can be implemented, and from block 708 the process moves to block 712.

If the determination at block 706 is No, then the process moves to block 710, where further pathway or tunnel adjustments are determined, for example changes in allocations of different data flows amongst the tunnels, based on characteristics of different CoS and/or QoS streams flowing to and from the local node and based on the performance data received at block 702. For example, a determination can be made to change from a pathway configuration like that of configuration 500 in FIG. 5 to a pathway configuration like that of configuration 501. The controller then sends information specifying the new configuration(s) to the local and affected core nodes so that they can implement the new configuration(s). In some embodiments, block 710 can include a determination whether or not to adjust pathway routing changes, and for that case in the event a determination of no adjustments is made, the process moves directly from the determination to block 712. Adjustments can be determined by comparing a second set of threshold values or factors against the various performance metrics received in block 702.

From block 710 the process moves to block 712 where a new time window for tracking of performance data is started, and from block 712 the process returns to block 702.

Some embodiments can include different variations of the process shown in FIG. 7. For example, primary path changes (or designating a different pathway to be a primary pathway) can occur separately from pathway routing changes for specific traffic (for example, specific CoS and/or QoS streams, with a stream in a single pathway or split by direction between multiple pathways), at different times and for different measurement time periods, or in conjunction with pathway routing changes for specific traffic within a same period or for a same measurement time period.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network controller device comprising:
   at least one processor; a network interface configured to be communicatively coupled to a core network;
   a storage device coupled to the at least one processor; and
   an application stored in the storage device, wherein execution of the application by the at least one processor configures the network controller device to perform acts comprising:
   monitoring performance of multiple communication pathways between routers in the core network and a local router, wherein the monitoring includes independently measuring at least one of a delay, jitter, and a frame loss ratio of a class of service during a first time period;
   comparing the at least one of a measured delay, jitter, and the frame loss ratio of the class of service during the first time period with a corresponding threshold value in a first set of thresholds to determine a primary tunnel and a secondary tunnel;
   setting a first tunnel delay threshold and a second tunnel delay threshold for communication pathways to configure the primary tunnel and the secondary tunnel, respectively, based at least on a comparison between the at least one of the measured delay, jitter, and the frame loss ratio and the corresponding threshold value in the first set of thresholds, wherein the first tunnel delay threshold includes a lesser value than the second tunnel delay threshold;
   measuring the at least one of the delay, jitter, and the frame loss ratio of the class of service during a second time period; comparing the at least one of a measured delay, jitter, and the frame loss ratio of the class of service during the second time period with a corresponding threshold value in a second set of thresholds to determine allocation of data stream flows of the class of service in the primary tunnel and the secondary tunnel that were configured from the communication pathways during the first time period;
   allocating the data stream flows to the primary tunnel and the secondary tunnel based at least on a comparison between the at least one of the measured delay, jitter, and the frame loss ratio of the class of service during the second time period with the corresponding threshold value in the second set of thresholds; and
   sending configurations of the communication pathways to the routers in the core network, wherein the configurations include the allocations of the data streams.

2. The device of claim 1, wherein the first set of thresholds include a delay threshold, a jitter threshold, and a frame loss ratio threshold.

3. The device of claim 2, wherein the primary tunnel includes the delay threshold, jitter threshold, or the frame loss ratio that is below 200 milliseconds, 100 milliseconds, or 0.2%, respectively.

4. The device of claim 1, wherein execution of the application configures the device to allocate an uplink data stream and a downlink data stream of the class of service to different communication pathways that include the primary tunnel and the secondary tunnel.

5. The device of claim 4, wherein the at least one of the delay, jitter, and frame loss ratio of the uplink data stream is measured independently from the downlink data stream during the second time period.

6. The device of claim 1, wherein different classes of services are measured in the primary tunnel and the secondary tunnel.

7. The device of claim 6, wherein the class of service includes at least one of Data, Voice, Signaling, Video or OAM (Operation and Administration), and each class of service includes a quality of service marking and a port number.

8. The device of claim 1, wherein the monitoring includes measurement of key performance indicators that include at least the delay, jitter and the frame loss ratio.

9. A method for configuring a network, comprising:
   receiving performance data with respect to a first time period for communication pathways between a local router and routers in a core network, the performance data including a measured at least one of a delay, jitter, and a frame loss ratio of a class of service during the first time period;
   comparing at the least one of a measured delay, jitter, and the frame loss ratio with a corresponding threshold value in a first set of thresholds to determine a primary tunnel and a secondary tunnel;
   in response to a comparison between the at least one measured delay, jitter, and the frame loss ratio and the corresponding threshold value in the first set of threshold values, setting, by the local router, a first tunnel delay threshold and a second tunnel delay threshold to configure the primary tunnel and the secondary tunnel, respectively, from the communication pathways, wherein the first tunnel delay threshold includes a lesser value than the second tunnel delay threshold;
   measuring the at least one of the delay, jitter, and the frame loss ratio of the class of service during a second time period; and
   in response to a comparison between the at least one measured delay, jitter, and the frame loss ratio of the class of service during the second time period with the corresponding threshold value in a second set of threshold values, reconfiguring allocations of data streams in the primary tunnel and the secondary tunnel that were configured from the communication pathways during the first time period.

10. The method of claim 9, further comprising sending configuration information that includes allocating an uplink data stream and a downlink data stream of the class of service to different communication pathways that include the primary tunnel and the secondary tunnel.

11. The method of claim 10, wherein the at least one of the delay, jitter, and the frame loss ratio of the uplink data stream is measured independently from the downlink data stream during the second time period.

12. The method of claim 9, wherein different classes of services are measured in the primary tunnel and the secondary tunnel.

13. The method of claim 12, wherein the different classes of service include at least one of Data, Voice, Signaling, Video or OAM (Operation and Administration), and each class of service includes a quality of service marking and a port number.

14. The method of claim 9, wherein the performance data includes measurement of key performance indicators that include at least the delay, jitter and the frame loss ratio.

15. One or more computer-readable storage media storing instructions that, when executed by one or more processors, cause the one or more processors to perform acts comprising:

monitoring performance of communication pathways between routers in a core network and a local router, with respect to a first time period and via performance measurement pipes configured to include multiple data streams, the monitoring including independently measuring each of key performance indicators of a class of service during the first time period;

comparing the at least one of the measured key performance indicators with a corresponding threshold value in a first set of thresholds to determine a primary tunnel and a secondary tunnel;

setting a first tunnel delay threshold and a second tunnel delay threshold for communication pathways to configure the primary tunnel and the secondary tunnel, respectively, based at least on a comparison between the at least one of the measured key performance indicators and the corresponding threshold value in the first set of thresholds;

measuring the at least one of the key performance indicators of the class of service during a second time period;

comparing the at least one of the measured key performance indicators of the class of service during the second time period with a corresponding threshold value in a second set of thresholds to determine allocation of data stream flows of the class of service in the primary tunnel and the secondary tunnel that were configured from the communication pathways during the first time period; and allocating the data stream flows to the primary tunnel and the secondary tunnel based at least upon a comparison between the at least one measured key performance indicator of the class of service during the second time period with the corresponding threshold value in the second set of thresholds.

16. The computer-readable storage media of claim 15, wherein the key performance indicators include at least a delay, jitter and frame loss ratio.

17. The computer-readable storage media of claim 15, wherein the first tunnel delay threshold includes a lesser value than the second tunnel delay threshold.

* * * * *